United States Patent [19]
Balliet et al.

[11] Patent Number: 4,458,985
[45] Date of Patent: Jul. 10, 1984

[54] OPTICAL FIBER CONNECTOR

[75] Inventors: Layton Balliet; Alvin H. Bauman, Jr.; Omkarnath R. Gupta, all of Boca Raton, Fla.

[73] Assignee: International Business Machines Corporation, Armonk, N.Y.

[21] Appl. No.: 312,067

[22] Filed: Oct. 16, 1981

[51] Int. Cl.³ .............................................. G02B 7/26
[52] U.S. Cl. ................................................ 350/96.21
[58] Field of Search ................ 350/96.20, 96.21, 96.22

[56] References Cited

U.S. PATENT DOCUMENTS

| | | | |
|---|---|---|---|
| 4,088,386 | 5/1978 | Hawk | 350/96.21 |
| 4,186,997 | 2/1980 | Schumacher | 350/96.21 |
| 4,253,730 | 3/1981 | Logan et al. | 350/96.21 |

FOREIGN PATENT DOCUMENTS 2717321 10/1978 Fed. Rep. of Germany ... 350/96.21

OTHER PUBLICATIONS

Balliet et al., "Rugged, Low Cost, Coined Connector with Lightly Polished Ends", *IBM Tech. Discl. Bull.*, vol. 24, No. 2, Jul. 1981, pp. 1151-1153.
Balliet et al., "Low Cost Fiber-Optic Connector with Integral Staking", *IBM Tech. Discl. Bull.*, vol. 24, No. 3, Aug. 1981, pp. 1624-1626.

*Primary Examiner*—John D. Lee
*Attorney, Agent, or Firm*—Harold H. Sweeney, Jr.

[57] ABSTRACT

An optical fiber connector is provided having identical connector halves including mating surfaces which are made of a soft metal and the surface configuration is coined or stamped therein by the same die to provide minimum manufacturing tolerance errors between fiber holding rails located in a channel on each surface. Locating holes and projections are likewise located in said mating surfaces so that, when one surface is reversed with respect to the other and mated thereto, the optical fibers placed between the rails and precisely cut with respect to a limit line will mate end to end coaxially with the end surfaces in the same plane.

10 Claims, 6 Drawing Figures

FIG. 4
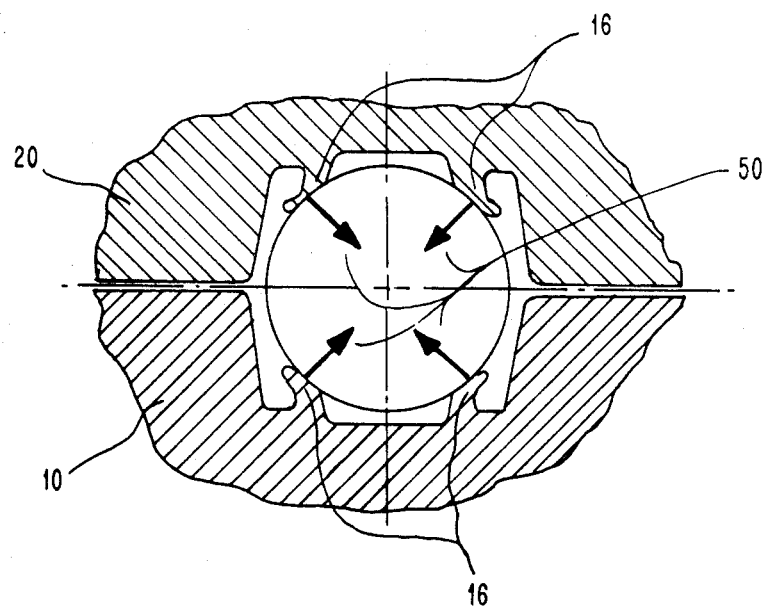
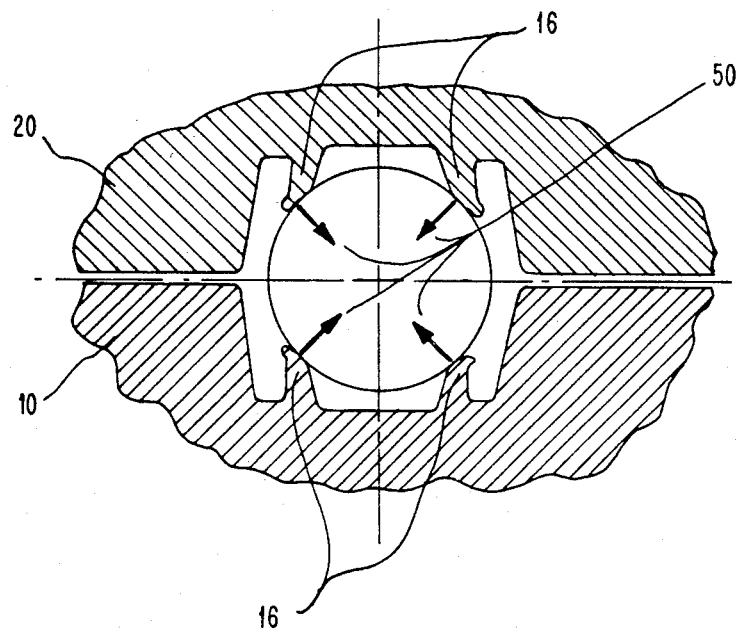
FIG. 5

OPTICAL FIBER CONNECTOR

BACKGROUND OF INVENTION

1. Field of Invention

This invention relates to optical fiber connectors and, more particularly, to fiber-optic connectors having identical connector halves in which manufacturing tolerance errors are reduced and the fibers to be coupled are mated with each other so as to minimize transmitted light losses. The connector is easily field-installed and replaced.

2. Description of the Prior Art

Fiber-optic transmission lines sometimes known as optical fiber waveguides are capable of high frequency transmissions over a long distance with relatively small losses. The fiber optic transmission line consists of a core of dielectric transparent material surrounded by a layer of transparent cladding material having a refractive index which is lower than that of the core. To make such fibers practical for optical communication systems, a low loss connector for quickly and conveniently connecting sections of fiber together is needed. Such a connector must cause light to be coupled from one fiber to another with little loss of signal, i.e., with low insertion loss.

For reasonably low insertion losses to be achieved, the centers of the fiber end faces must, therefore, be registered. Furthermore, due to the high numerical aperture of many optical waveguides, fiber alignment is especially important. Since light diverges from the fiber axis as it travels through a fiber interface, some light is lost if the end faces of the fibers are separated; therefore, the end faces of the fibers should be maintained in virtual contact. Fiber-to-fiber separation also implies an insertion loss due to Fresnel reflections at one of the two glass end interfaces.

U.S. Pat. No. 4,088,386 discloses an optical fiber connector comprising a first resilient member having an elongated V-shaped groove in the surface thereof into which two fibers to be optically connected are disposed end-to-end. A second resilient member is urged against that portion of the fibers opposite the first member, thereby causing a slight deformation of the second member and the slot forming walls. The substantial equilibrium of forces applied to the two fibers by the resilient members causes their axes to reduce misalignment. This arrangement and the other known arrangements for connecting optical fibers suffer from one or more of the following disadvantages: The connectors are expensive, generally due to the necessity of having precision parts which require considerable time and labor to manufacture. Many of the known arrangements require the use of slow drying epoxies which require long curing times. Many of the arrangements require grinding and polishing of the ends of the optical fibers, which actions are not easily performed in the field. Many of the arrangements are not sufficiently self-centering to overcome the losses due to manufacturing tolerance buildup in the coupling mechanism. For example, the use of rubber or plastic members in the connector introduce errors due to shrinkage after molding or casting. The fibers are often concealed so that they are not easily inspected and cleaned as required in maintenance and trouble shooting.

SUMMARY OF THE INVENTION

These disadvantages of the prior art are overcome by providing the connector of the present invention which comprises an optical fiber connector having a first and second identical connector half, each having a surface which is identically coined or stamped. The coined surfaces, each including a pair of parallel, thin, resilient supporting rails separated from each other by a distance less than the diameter of the optic fiber to be coupled. The rails on each connector are located in a trench and help support and center a fiber placed therebetween. Each connector half includes a pair of alignment holes and a pair of alignment protuberances coined into each connector half surface and separated from each other and of a shape and size to mate where the connector halves are mated. The fiber is secured in place by staking or hot upsetting. A tool is included for severing the fiber optic line at right angles to the axis thereof at the same place on each connector half. The connector halves having the coined surfaces thereof mated, the exact location is established by the mating alignment holes and protuberances to thereby bring the ends of the fiber optic lines to be coupled into coaxial alignment and abutting in the same plane.

A plurality of fibers may be connected or coupled in the same connector by utilizing a plurality of pairs of rails for holding the fibers therebetween.

The main advantage of the present invention is that the light losses due to the coupling are diminished because of the identical connector halves made to tight precision tolerances by coining. Also, the shape and the softer metal used for the alignment rails provide a proportionate yield to accommodate different diameter fibers to improve the coupling efficiency.

BRIEF DESCRIPTION OF THE DRAWINGS

FIG. 4 is a schematic cross-sectional diagram of the rail area taken along the line 4—4 of FIG. 3 showing the self-centering effect of the rails of mated connector halves on a large diameter optical fiber.

FIG. 5 is a schematic cross-sectional diagram along the lines 5—5 of FIG. 3 showing the self-centering of forces of the rails of mated connected halves on a smaller diameter optical fiber.

DESCRIPTION OF THE PREFERRED EMBODIMENTS

Figure 1:
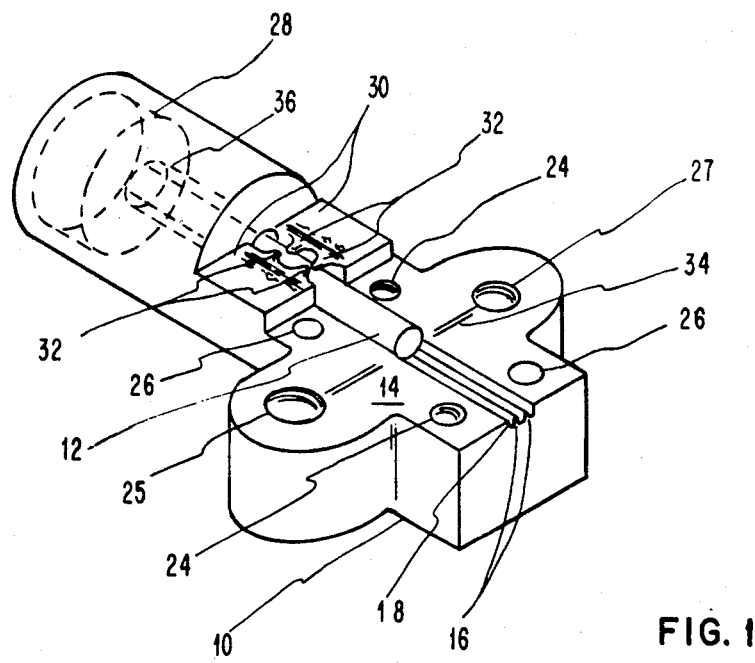
FIG. 1 is an isometric view showing a connector half of the present invention with an optical fiber contained therein.

The field installable fiber optic connector of this invention is manufactured using a low cost coining or stamping operation, which gives precision alignment of optical fibers coupled thereby because of the extremely low manufacturing tolerance errors involved on each connector half. The connector consists of two identical connector halves 10 and 20, one of which is shown in FIG. 1, one for each of the two fiber optic lines 12 and 22 being coupled. Each connector half consists of a single piece of soft metal with the top surface 14 coined or stamped to provide a precision self-alignment pair of rails 16 located within a trench 18 in the top surface 14. A pair of aligning semispherical protrusions 24 and semispherical receiving holes 26 are provided in the top surface 14 of the connector half. Since the semispherical protrusions 24 and holes 26 are identical on identical connector halves, reversing and mating the connector halves will cause precision alignment by the fitting of the semispherical protrusions 24 into the opposing semispherical holes 26 or openings in the mating surfaces. The surface 14 generated by coining or stamping provides the high precision trench 18 and rail 16 surface location required for accurately positioning the fibers 12 and 22 to be coupled. This manufacturing process also provides the precision location of the aligning semispherical protrusions 24 and holes 26 in the surfaces 14 to give the accurate positioning for mating required for aligning the fiber axes.

Before the surface 14 of the connector half is coined or stamped, a crimp area 28 is formed on the rear portion of the connector for grasping the fiber casing. Forward of this crimp area a step 30 is formed on each side of the channel 18. Staking points 32 or ears are formed by a staking tool, which is forced into the soft metal of the surface 30 on each side of trench 18. The V or pyramid shaped ends of the tool force soft metal around the fiber 12 locking it in place. Hot upsetting could also be used to secure the fiber. One of the semispherical projections 24 is located on one side of the channel 18 with the semispherical hole or opening 26 located on the opposite side of the channel. Similarly, a semispherical hole 26 and protrusion 24 are located near the end of the connector half, one on each side of the channel 18, but with the protrusion and hole reversed with respect to the previously mentioned protrusion and hole. As previously mentioned, when the mating connector halves 10 and 20 are brought together, these protrusions 24 and mating holes 26 provide precise alignment of the two connector halves. An arrangement for drawing the connector halves 10 and 20 together, and for locking them in place once they are mated, is provided via a threaded hole 25 on one side of the channel 18 and a non-threaded hole 27 on the other side of the channel. It will be appreciated that, when the connector halves 10 and 20 are reversed with respect to each other and the mating surfaces mated, the bolts 44 will pass through the non-threaded hole into the threaded hole from opposite sides and will provide a drawing of the two connector halves together.

Figure 2:
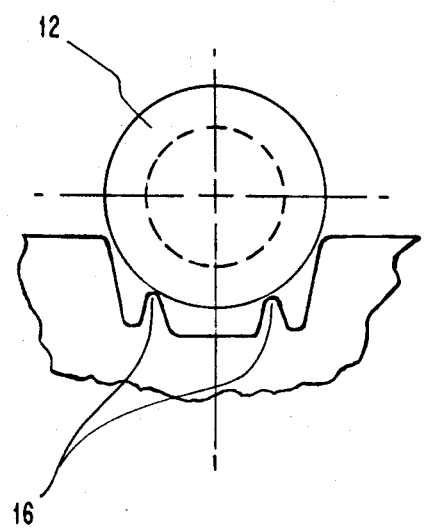
FIG. 2 is a blown-up end view of the rail section of the connector half, showing an optical fiber resting thereon.

The shape of the supporting rails 16 for supporting the optical fiber can be seen best in FIG. 2. The rails 16 are located side by side running lengthwise along the connector half 10 within a channel 18 formed therein. As previously mentioned, the rails 16 and the channel 18 are formed by a precision coining or stamping operation in the soft metal. The rails are sufficiently thin such that a given pressure thereon will provide proportionate give or bending to position the optical fiber located thereon. An optical fiber 12 is schematically shown resting on the rails 16 in undeformed form in FIG. 2. The channel or trench 18 is sufficiently deep with respect to the rail height to allow contact of the mating coined surfaces 14 when the connector halves 10 and 20 are reversed and mated with fibers in place.

Figure 6:
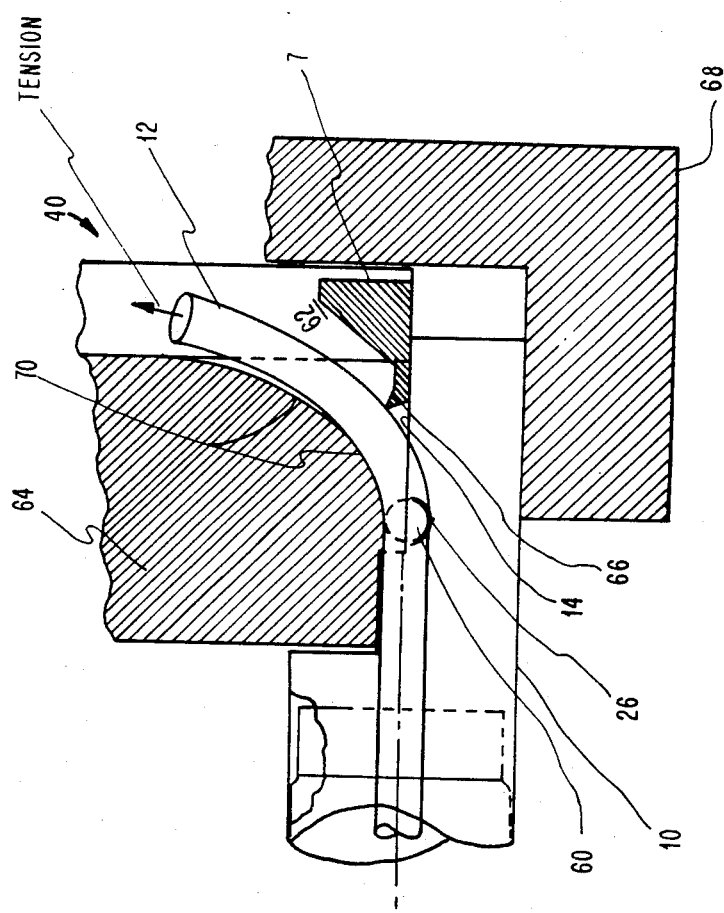
FIG. 6 is a schematic diagram showing the cutting tool used with the present invention for providing a precision located severing of each fiber to be connected.

The fibers 12 and 22 are prepared by extending the fibers approximately one to one and a half inches from the fiber casing. The fiber is then passed through the hole 36 in the crimp area and is directed along the rails 16 until it extends beyond the fiber limit line 34, which is formed in the coined surface 14 of the connector half. The connector half is then crimped on the fiber casing at the crimp area 28 originally provided on the connector. This fixes the connector half to the fiber and provides strain relief. A special tool 40, as shown in FIG. 6, is used to cut the fiber at the precise point defined by the fiber limit line 34. The special tool 40 has a semispherical protuberance 60 and a semispherical hole located on a surface thereof, which are exactly indexed with a hole 26 and protuberance 24, respectively, on the connector half. The tool 40 mounted on the surface 14 in this manner will give a precise cutting point of the fiber on each connector half on which it is used, since the holes and semispherical protuberances on the cutting tool 40 are exactly located so as to mate with indexed protuberances and holes on the connector halves.

As the cutting tool 40 is being placed on the surface of the connector half 10 the fiber 12 located in the connector half is brought up through the opening 62 between the upper holding jaw 64 and the cutting element 66. Once the protuberances 24 and 60 and the openings are mated, the jaws 64 and 68 are drawn together to hold the connector half in place. Tension is applied to the fiber at the end thereof to cause it to bend around the curved surface 70 of upper jaw 64. The scriber 66 is moved laterally with respect to the fiber, scoring the surface thereof so that when further tension is applied at the end of the fiber a clean break at the scored line will take place which is at right angles to the center line of the fiber and is a clean cut without any lip or hackles.

It should be appreciated that the cut will be at the same location for each connector half since the location of the cutting tool 40 is precisely fixed with respect to the highly accurate dimensioned surface 14 of the connector half. The cutting tool is dimensioned to provide the cut in the fiber at the fiber limit line 34. Thus, when the connector halves are reversed and mated, the cut fiber ends will abut one another.

Coupling of the fiber optic lines can be further enhanced by using index matching fluid at the interface.

Both fibers 12 and 22, when in place in the connector halves 10 and 20, are aligned by their respective connector half while the screws 44 (shown in FIG. 3) are tightened to draw the two halves 10 and 20 together. The fibers 12 and 22 are centered between the rails 16 upon which they lie, as shown in FIG. 2, before the two connector halves are drawn together. When the screws 44 are tightened further, drawing the connector halves together, the fiber 12 with the larger diameter will be contacted by the juxtaposed pairs of rails 16. The fiber 22 with the smaller diameter, in the case of different diameter fibers being coupled, has not as yet been contacted by the juxtaposed rails 16. When the screws are tightened further, the fiber 12 with the larger diameter will exert force on the rails 16 of both the connector halves 10 and 20, as seen in FIG. 4. The rails 16 will deform due to the softness of the material (soft metal) and the thin shape of the rails. Actually the rails 16 provide a radial centering force at four different but symmetrical places, as depicted in FIG. 4 by the arrows 50 which keeps the fiber in the center of the circle formed by the points of contact. When the screws 44 are tightened further, the smaller diameter fiber will be contacted by the juxtaposed rails 16 which deform. This deformation of the two sets of opposing rails 16 provides a centering force on the respective fibers to the same virtual circle. The axis of both fibers have a common center. Thus, the unique shape and softness of the connector half material which provides the proportionate giving of the rails to accommodate dissimilar fiber diameters provides a self-aligning low loss connector when assembled.

The connector design is not restricted to any specific fiber size; however, FIG. 4 is a schematic diagram illustrating the deformation of the rails for a 0.00525 inches large diameter fiber and also indicating the radial extent of the forces tending to center the optical fiber. Similarly, FIG. 5 shows the deformation of mated connector halves for a 0.00475 inches smaller diameter fiber. The radial forces inward are depicted on both Figures by the arrows. The extent of the force is indicated by the length of the arrow. It should be appreciated that the larger diameter and smaller diameter optical fibers are aligned within the assembled connector halves such that the center axis of both optical fibers are aligned. This alignment provides very low losses of the light coupled from fiber to fiber.

A high precision connector is obtained by using the coining process, which gives a rail to surface manufacturing tolerance which is very precise, and which is the same for the identical mating parts since the same coining die is utilized for both. The unique shape and softness of the alignment rails, provides the proportionate yield to accommodate the different diameter fibers to improve the coupling efficiency.

Field installation of the connector using the proper tools requires only a few minutes. Also, the arrangement permits inspection of the fiber ends by simple disassembly of the mated connector halves.

Figure 3:
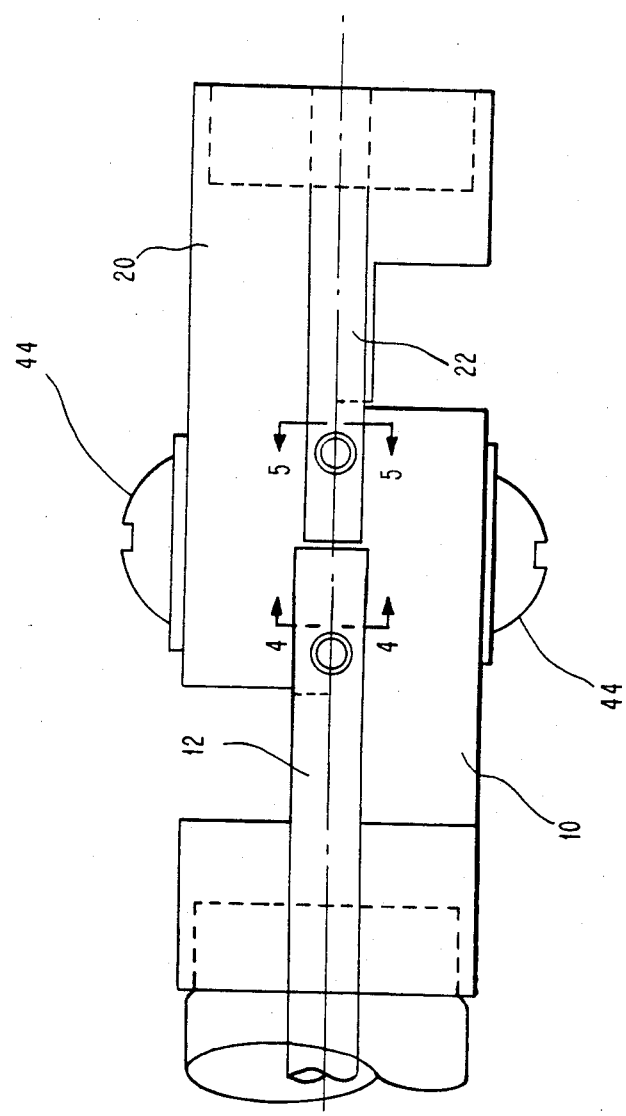
FIG. 3 is a side view of a pair of mated connector halves.

Referring to FIG. 3, the mating of the two connector halves as shown in FIG. 1, should cause the end faces of the respective fibers to abut with the center axes aligned to give the required low loss light coupling.

What is claimed is:

1. A connector for coupling fiber optic lines comprising:
   a first and second identical connector half, each having a surface which is identically coined or stamped using the same die;
   a pair of parallel thin supporting means separated from each other by a distance less than the diameter of the optic fibers to be coupled stamped into said surface of each of said connector halves so as to support and center a fiber placed therebetween;
   at least one alignment hole and one alignment projection located on said coined surface and separated from each other and of a shape and size to mate when one connector half is reversed and mated with the other;
   means for holding a fiber optic line in place between said supporting means on said coined surface of each of said first and second connector halves;
   severing means for severing a fiber optic line at right angles to the axis of the fiber optic line at the same place on each connector half;
   and connecting means for drawing and receiving said coined surfaces of said first and second identical connector halves together, the exact location being established by said mating alignment holes and said alignment projections to thereby bring the ends of said fiber optic lines to be coupled into coaxial alignment abutting in the same plane.

2. A connector according to claim 1, wherein at least said surfaces of said first and second connector halves to be coined are made of a metal soft enough to be accurately stamped.

3. A connector according to claim 1, wherein said pair of parallel thin supporting means on each of said coined surfaces are rails which support the fiber optic lines to be coupled in the center thereof and exert a radial force thereon as the first and second identical connector halves are mated, thereby centering and aligning coaxially the fiber optic lines.

4. A connector according to claim 3, comprising a fiber optic line of larger diameter and a fiber optic line of smaller diameter wherein said rails are sufficiently thin to provide resilient support for said fiber optic line of larger diameter held therebetween as said identical mated connector halves are drawn together and then providing resilient support for said fiber optic line of smaller diameter, the resilient support causing said fiber optic line of larger diameter and said fiber optic line of smaller diameter to align coaxially.

5. A connector according to claim 1, wherein said pair of parallel thin supporting means are located in a channel which extends lengthwise along the middle of the coined surface of each connector half, the channel depth being related to said pair of supporting means so as to provide coined surface contact when the connector halves are mated with fibers therebetween.

6. A connector according to claim 1, wherein each coined surface of each connector half includes a step and said means for holding a fiber optic line in place comprises staking means which extend from said step in said connector half against said fiber optic line to maintain said optic fiber line in place.

7. A connector according to claim 1, wherein each connector half has a strain relief means extending from the back end of said connector half where said fiber optic line is gripped to provide strain relief.

8. A connector according to claim 1, wherein said severing means includes a tool having an alignment hole and an alignment projection adapted to mate with one of the alignment projections and alignment holes, respectively, in each of said connector halves to thereby provide the cut in the fiber optic line at the same point relative to its connector half so that, when the connector half mating surfaces are drawn together, the cut ends of the fiber optic lines will lie in the same plane and abut one another.

9. A connector according to claim 1, wherein said connecting means for each connector half includes a hole therethrough and a threaded hole therein so that a connector half, when reversed and mated with the other connector half, can be drawn together by threaded bolts operating through said holes and in said threaded holes.

10. A connector according to claim 1, wherein said surfaces to be mated on each connector half have limit lines coined therein at which the fiber optic lines are to be severed.

* * * * *